Dec. 22, 1964   J. MORGAN ETAL   3,162,173
GAUGE
Filed Sept. 26, 1962

INVENTORS
JACK MORGAN
EARL DONALD ZUCK
BY
Robertson and Smythe
ATTORNEYS

# United States Patent Office 3,162,173
Patented Dec. 22, 1964

3,162,173
GAUGE
Jack Morgan, Maple Glen, and Earl Donald Zuck, Quakertown, Pa., assignors to Ametek, Inc., New York, N.Y., a corporation of Delaware
Filed Sept. 26, 1962, Ser. No. 226,313
5 Claims. (Cl. 116—129)

The present invention relates to gauges and particularly to an improved receiver gauge. Receiver gauges are special purpose, low pressure gauges used to indicate values transmitted by a pneumatic signal from a remote location. Such gauges are usually designed to operate within a predetermined standard range of pressures, e.g., 3 to 15 p.s.i. The pressure sensing element may be a Bourdon tube or a diaphragm means.

The dial of such a receiver gauge is usually provided with indicia representing such standard range of pressures. Heretofore when such a gauge was used to indicate variable conditions within a process, it was necessary to calibrate the gauge throughout its range of operation and to provide corresponding indicia on its dial indicating the variable condition within the process which is desired to be known.

The principal object of the invention is to provide a receiver gauge that will indicate a variable condition such as temperature, pressure or other variable within a process with which the gauge is employed.

Another object of the present invention is to provide such a receiver gauge including a sub-dial having indicia representing a standard range of pressures thereon and a separable selected scale of predetermined indicia.

Still another object of the invention is to provide such a receiver gauge comprising separable dials, so that a combined gauge can be easily assembled for a process requiring a predetermined range of temperatures, pressures or other variable conditions.

Still another object of the invention is to provide such a receiver gauge in which the separable indicia bearing members are adjustable relatively to each other.

In one aspect of the invention, a receiver gauge may comprise a housing in which a sub-dial may be fixedly supported, the sub-dial in turn supporting a conventional pressure sensitive element and a gauge movement such as a Bourdon tube or diaphragm type. The fixed or sub-dial may be provided with indicia representing a standard range of pressures, for example, a range from 3 to 15 pounds per square inch.

In still another aspect of the invention, the Bourdon tube or diaphragm and the movement may be adapted to operate a pointer riding over the face of the sub-dial, and the gauge may be calibrated so that the pointer accurately follows the indicia on the sub-dial.

In still another aspect of the invention, a series of annular dial members may be provided having indicia beginning and terminating at the initial and terminal points of the indicia on the fixed or sub-dial that represent the standard range of pressures.

In still another aspect of the invention, the annular dials may be provided with spaced tongue or clip means extending rearwardly from the dials and adapted to spring over the peripheral edge of the fixed dial.

In a still further aspect of the invention, means in the form of a set screw and elongated slot may be provided for effecting relative adjustment between the fixed and annular dials so as to align their initial and terminal indicia.

By using such a receiver gauge, variations in process conditions can be indicated on the annular dial. Furthermore, a great number of receiver gauges having fixed dials accurately calibrated for the standard range of pressures, e.g., 3 to 15 p.s.i., can be stocked, as can large quantities of annular dials having indicia representing widely different process conditions. It is only necessary, then, to select the annular dial having the correct indicia for the variable condition of the process under consideration, and to attach it to the fixed dial of one of the standard calibrated receiver gauges, adjusting the two dials to provide the proper indicia alignment.

The above, other objects and novel features of the invention will become apparent from the following specification and accompanying drawing which is merely exemplary.

Figure 1:
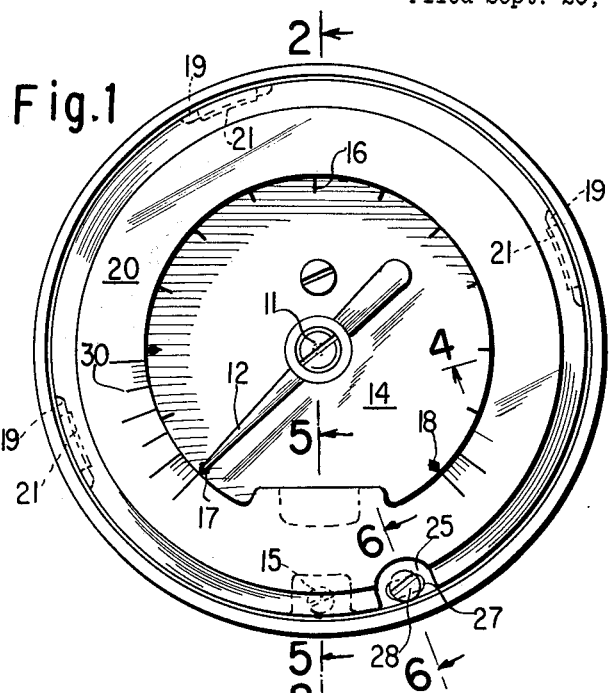
FIG. 1 is a front elevational view of a receiver gauge to which the principles of the invention have been applied.
Figure 2:
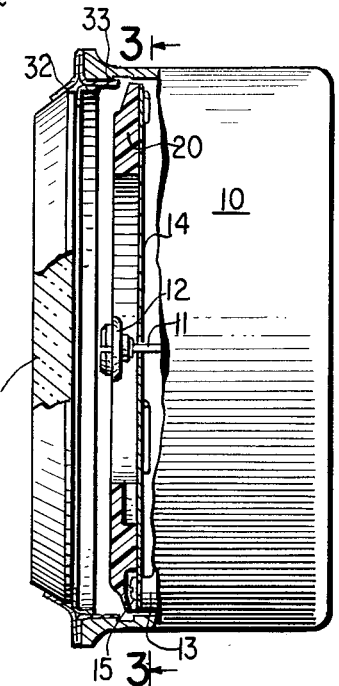
FIG. 2 is a side elevational view, partly in section, of the gauge shown in FIG. 1 and taken substantially along line 2—2 of FIG. 1.
Figure 3:
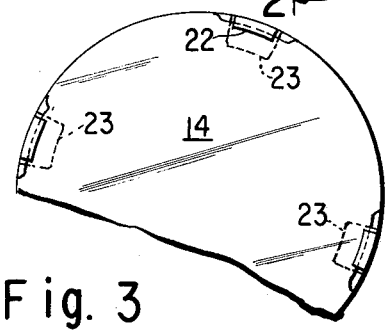
FIG. 3 is a view in a reduced scale of the peripheral construction of the fixed dial within the gauge shown in FIGS. 1 and 2.
Figure 5:
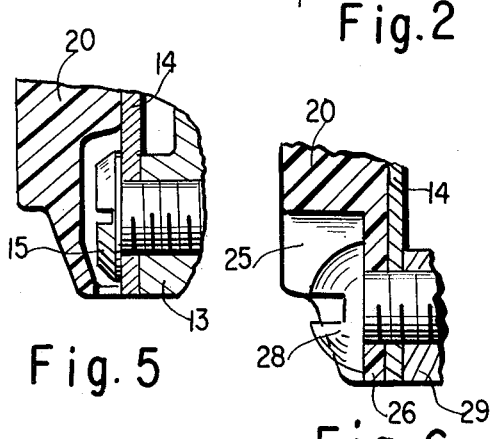
FIG. 5 is a partial sectional view taken substantially along line 5—5 of FIG. 1.

Referring to the drawing, and particularly to FIGS. 1 and 2, the principles of the invention are shown as applied to a receiver gauge including a housing 10 in which may be mounted a pressure sensing mechanism, such as a Bourdon tube, diaphragm or the like, and multiplying lever means (not shown) for rotating a spindle 11 to which a pointer 12 may be fixed. The pressure responsive means of the Bourdon tube or diaphragm type of gauge may include a mounting having posts 13 (only one being shown) extending therefrom. These posts may be of the same axial length and may have a sub-dial 14 fixed to their tops by screws 15. The fixed sub-dial 14 may be provided with indicia 16 extending from a low limit at 17 to a high limit at 18. The gauge is calibrated so that the indicia 16 between points 17 and 18 are accurate within the range of pressures standard for receiver gauges of a particular manufacture, e.g., from a low of 3 p.s.i. to a high of 15 p.s.i.

Figure 6:
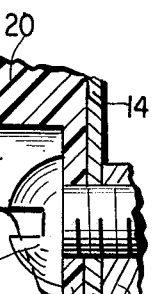
FIG. 6 is an enlarged partial sectional view taken substantially along line 6—6 of FIG. 1.
Figure 4:
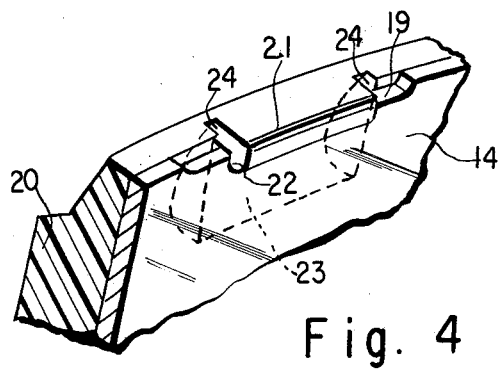
FIG. 4 is an enlarged partial sectional view taken substantially along line 4—4 of FIG. 1.

In the present invention, the fixed sub-dial 14 is provided with peripherally spaced, undercut portions 19. An annular-shaped dial 20 that preferably is made from a plastic material may include peripherally spaced tongue members or clip means 21 having a beaded outer edge 22 adapted to be forced over the peripheral edge of the fixed sub-dial 14 at the location of the recessed portions 19. In order to provide sufficient resiliency to the tongue members 21 while retaining the overall thickness of the annular dial at a minimum, radially extending pockets 23 are formed in the annular dial and recesses 24 are provided at each side of tongue members 21. Referring to FIGS. 1 and 6, the annular dial 20 may include a pocket 25 providing a thin section 26 in which an elongated slot 27 may be located. A screw 28 may extend through the slot 27 and be threaded into a boss 29. Accordingly, loosening the screw 28 will permit adjustment of the annular dial 20 relative to the fixed sub-dial 14.

The annular dial 20 may be provided with indicia 30 covering a range commensurate with the variable of a process which is desired to be indicated. The gauge manufacturer may have a wide stock of annular dials 20 having indicia 30 representing different variables of different processes, but all beginning and terminating at the same angular positions as the indicia 16 on the fixed sub-dial 14. Accordingly, knowing the range of the variable to be indicated within a process, a given annular dial 20 may be selected and snapped onto the fixed calibrated sub-dial 14 of a receiver gauge. Adjustment may be effected as previously described in order to properly align the beginning and end of the indicia 30 and 16. It is evident, therefore, that a standard calibrated receiver gauge can be combined with a selected annular dial 20 to produce a receiver gauge for any process having any range of values of a variable therein desired to be observed.

A transparent face 31 may be held to the housing 10 over the sub-dial 14 and dial 20 by a bezel 32 which may be securely held to the housing 10 by a press fit between said housing and a flange 33 of the bezel.

Although the various features of the improved receiver gauge have been shown and described in detail to fully disclose one embodiment of the invention, it will be evident that changes may be made in such details and certain features may be used without others without departing from the principles of the invention.

What is claimed is:

1. In a receiver gauge having a condition responsive movement therein and a pointer, said gauge having sub-dial means with predetermined scale indicia including marked end limits thereon, said gauge being calibrated so as to be accurate between said end limits of said sub-dial scale indicia, the combination with said sub-dial, of annular dial means having predetermined indicia thereon, the end limits of which correspond to those of said indicia on said sub-dial and means between said sub-dial and annular dial means for retaining said end limits of both the sub-dial and annular dial in registering and cooperating positions, whereby a receiver gauge can be assembled from a gauge having a standard calibrated sub-dial and a selected annular dial having indicia thereon representing the range of variation of a condition in a process.

2. In a receiver gauge having a condition responsive movement therein and a pointer, said gauge having sub-dial means with predetermined scale indicia thereon, said gauge being calibrated so as to be accurate between the limits of said scale indicia, the combination with said sub-dial, of annular dial means having predetermined indicia thereon, said annular dial means including peripherally spaced, resilient clip means on said annular dial at spaced positions thereon and adapted to be snapped over the peripheral edge of said sub-dial means, whereby a receiver gauge can be assembled from a gauge having a standard calibrated sub-dial and a selected annular dial having indicia thereon representing the range of variation of a condition in a process.

3. In a receiver gauge having a condition responsive movement therein and a pointer, said gauge having sub-dial means with predetermined scale indicia thereon, said gauge being calibrated so as to be accurate between the limits of said indicia, the combination with said sub-dial, of annular dial means having predetermined indicia thereon, said annular dial means including peripherally spaced, resilient clip means on said annular dial at spaced positions thereon and adapted to be snapped over the peripheral edge of said sub-dial means, whereby a receiver gauge can be assembled from a gauge having a standard calibrated sub-dial and a selected annular dial having indicia thereon representing the range of variation of a condition in a process; and means for adjusting said annular and sub-dial means relative to each other within narrow limits.

4. In a receiver gauge having a condition responsive movement therein and a pointer, said gauge having sub-dial means with predetermined scale indicia thereon, said gauge being calibrated so as to be accurate between the limits of said scale indicia, the combination with said sub-dial, of plastic annular dial means having predetermined indicia thereon, said annular dial means including peripherally spaced, resilient clip means on said annular dial as spaced positions thereon and adapted to be snapped over the peripheral edge of said sub-dial means, whereby a receiver gauge can be assembled from a gauge having a standard calibrated sub-dial and a selected annular dial having indicia thereon representing the range of variation of a condition in a process.

5. In a receiver gauge having a condition responsive movement therein and a pointer, said gauge having sub-dial means with predetermined scale indicia thereon, said gauge being calibrated so as to be accurate between the limits of said scale indicia, the combination with said sub-dial, of plastic annular dial means having predetermined indicia thereon, said annular dial means including peripherally spaced, resilient clip means on said annular dial at spaced positions thereon and adapted to be snapped over the peripheral edge of said sub-dial means, whereby a receiver gauge can be assembled from a gauge having a standard calibrated sub-dial and a selected annular dial having indicia thereon representing the range of variation of a condition in a process; and means for adjusting said annular and sub-dial means relative to each other within narrow limits.

References Cited in the file of this patent

UNITED STATES PATENTS

| | | |
|---|---|---|
| 1,371,371 | Hinsman | Mar. 15, 1921 |
| 2,633,018 | McIlaine | Mar. 31, 1953 |
| 2,905,138 | Nicolous | Sept. 22, 1959 |